Patented Sept. 8, 1953

2,651,592

UNITED STATES PATENT OFFICE 2,651,592

ENZYMATIC PROCESS FOR PRODUCING GLUCONIC ACID

Dwight L. Baker, Park Forest, Ill., assignor to Ben L. Sarett, Chicago, Ill.

No Drawing. Application August 15, 1950, Serial No. 179,651

6 Claims. (Cl. 195—36)

This invention relates to an enzymatic process and has for an object the treatment of solutions containing an aldose such as glucose.

A further object of this invention is the provision of a process for removing aldoses from solution.

A further object of this invention is the provision of an enzymatic process for the preparation of sugar acids from aldoses.

A still further object of this invention is the provision of an enzymatic process for separating sugars.

A still further object of this invention is the provision of a highly efficient and commercially feasible process for the conversion of glucose to gluconic acid by means of the enzyme glucose oxidase.

A still further object of this invention is the provision of an improved process for removing glucose from solution or other aqueous media by means of the enzyme glucose oxidase.

A still further object of this invention is the provision of a highly efficient method for the production of gluconic acid by the enzymatic conversion of glucose which acid may actually be separated from the treated solution in the form of a precipitatable salt, such as calcium gluconate.

A still further object of this invention is the provision of an improved process for treating glucose-containing solutions which involves the utilization of an enzyme system containing glucose oxidase.

A still further object of this invention is the provision of a procedure for treating a solution containing glucose with an enzymatic system derived from certain molds.

A still further object of this invention is the provision of a method for oxidizing glucose in solution in such a manner that the glucose is rapidly and substantially quantitatively oxidized to gluconic acid.

Further and additional objects will appear from the following description and the accompanying claims.

In carrying out this invention in one form, a process has been devised for treating a solution containing an aldose which comprises adding to the solution an anzyme system having an oxidase activity specific for the aldose, hydrogen peroxide, and a substance capable of decomposing the hydrogen peroxide in the solution to liberate free oxygen and water.

In accordance with a preferred embodiment of this invention, the process includes the step of treating an aqueous solution containing glucose with hydrogen peroxide and an enzyme system having glucose oxidase and catalase activity. The hydrogen peroxide is decomposed by the catalase to form free oxygen and water in accordance with the following equation:

(1) $\quad 2\ H_2O_2 \rightarrow 2\ H_2O + O_2$

The glucose is oxidized by the free oxygen in the presence of glucose oxidase to form gluconic acid in accordance with the following equation:

(2) $\quad 1\ \text{glucose} + O_2 + H_2O \rightarrow$
$$1\ \text{gluconic acid} + H_2O_2$$

By combining Equations 1 and 2 it will be noted that the over-all reaction may be represented by the following equation:

(3) $\quad 1\ \text{glucose} + H_2O_2 \rightarrow 1\ \text{gluconic acid} + H_2O$ Thus the glucose oxidase in the process of this invention serves as the catalyst for the oxidation of glucose to gluconic acid, and the catalase serves as the catalyst for the decomposition of the hydrogen peroxide. Free oxygen is required for the oxidation of glucose, and this oxygen must be supplied from an external source.

In accordance with one embodiment of this invention, this free oxygen supply requirement has been achieved by adding additional amounts of hydrogen peroxide to the solution undergoing conversion. Thus this invention in one aspect permits the use of hydrogen peroxide as an oxidizing agent for the conversion of an aldose to a corresponding sugar acid. The added hydrogen peroxide is decomposed to free oxygen and water by the catalase in the system and the free oxygen is utilized in the reaction involving the oxidation of the aldose sugar, such as glucose, to the corresponding sugar acid.

It will be noted from a consideration of Equation 2 that hydrogen peroxide is actually formed as an intermediate compound in the process. However, the peroxide is immediately decomposed by the catalase in accordance with Equation 1 to supply additional free oxygen. Inasmuch as there is an over-all net consumption of hydrogen peroxide in the system, it is necessary to supply a stoichiometric excess of this substance from an external source in accordance with this invention, to satisfactorily complete the oxidation of the glucose in the solution being treated.

The process of this invention has wide applicability both in the preparation of sugar acids and in the removal of certain sugars from a solution. The invention also has applicability in the separation of two different sugars from a single solution. The process is very simple to carry out inasmuch as it is effected in the absence of viable and propagating microorganisms and sterilizing or pasteurizing techniques are not necessary and inasmuch as sugar concentrations can be employed which are far above the dilute concentrations necessary where such conversion or separation is attempted by microbiological fermentation methods.

For a more complete understanding of this invention, reference will be made to a specific example in which there is disclosed a process of preparing gluconic acid from glucose: An aqueous solution of glucose was prepared containing approximately ten parts by weight of glucose to 100 parts by weight of water. To this solution was added one part by weight of an enzyme preparation having a high glucose oxidase activity, the activity being on the order of about 300 units of glucose oxidase per cubic centimeter enzyme preparation. Also added to the solution were 2½ parts by weight of calcium carbonate and about ½ part by weight of an enzyme preparation having a catalase activity on the order of 100 units per cubic centimeter. The resulting solution of sugar and added enzymes containing suspended calcium carbonate particles was agitated gently and to it was gradually added a stoichiometric excess of 30 per cent hydrogen peroxide (100 volume) at a rate such that little or no gaseous oxygen was evolved. The mixture was agitated for a period of several hours during which time the hydrogen peroxide was added gradually, it not being necessary to add any more hydrogen peroxide than was necessary to oxidize the glucose present in accordance with the foregoing equations. The total amount of hydrogen peroxide added was somewhat in excess of 6 parts by weight of 30 per cent $H_2O_2$. In the event that large batches of solutions are treated by this process, especially with higher glucose oxidase activity and more rapid addition of hydrogen peroxide, it may be necessary to cool the reaction mixture to prevent the excess development of heat. The process is satisfactorily carried out at room temperatures, satisfactorily between about 25 and 40° C.

During the course of the reaction it will be observed that the calcium carbonate suspended in the solution disappears with the attendant liberation of carbon dioxide due to th formation of calcium gluconate which remains in solution. After about two hours or somewhat longer under the conditions indicated above, the reaction was substantially complete. Thereafter acetone was added in an equal amount to the reacted clear solution. The added acetone causes the solution to turn milky and an oil comprising essentially calcium gluconate separates out. Upon standing overnight the oil crystallizes to produce a substantially quantitative yield of high quality calcium gluconate from the solution. If desired, alcohol may be substituted for the acetone in precipitating the gluconic acid salt.

In the foregoing example a batch process has been indicated. However, it will be apparent that by the proper addition of the several reagents the process could be made continuous or semi-continuous and the enzymes could be recycled and continuously reused for the conversion of additional glucose to the gluconic acid.

In the foregoing example it was indicated that an enzyme solution was used having a glucose oxidase activity of about 300 units per cubic centimeter. Such a glucose oxidase product may be prepared by any of the methods that are well known in the art. For example, a suitable method has been disclosed in my prior Patent No. 2,482,724, dated September 20, 1949, now Reissue Patent No. 23,523, dated July 22, 1952, and one has been described by Coulthard et al. in Biochemical Journal, volume 39, page 24 (1945). As indicated in my prior patent, a preferred source of glucose oxidase is the mycelia of species of molds selected from the genus Aspergillus and the genus Penicillium. One unit of glucose oxidase may be defined as that amount of enzyme which will cause the uptake of 10 cubic millimeters of oxygen per minute at 30° C. under conditions in which 100 cc. of 3 per cent glucose adjusted to pH 5.9 in a 1/10 molar aqueous phosphate buffer is rapidly added to 1/10 cc. of enzyme solution being assayed and wherein the resulting solution is tested in 2.2 cc. quantities in 15 cc. Warburg flasks in a standard Warburg respirometer. The rate at which the oxidation of the glucose will occur in the process of this invention is dependent, in part, upon the amount of glucose oxidase added, a more rapid reaction being evident as the amount of glucose oxidase is increased.

Likewise the catalase employed in the above example may be obtained from any desired source, a suitable source being that disclosed in my copending application Serial No. 788,036, filed November 25, 1947, now Patent No. 2,635,069. The amount of catalase will, of course, be dependent upon the desired rate and amount of hydrogen peroxide that is to be decomposed.

In order to assay a standard enzyme solution for catalase activity, 0.04 cc. of the enzyme preparation is added to a 250 cc. beaker. Then 100 cc. of 5 volume hydrogen peroxide (1.5%) buffered to pH 7.0 is added to the beaker and the mixture is allowed to stand for ½ hour as 25° C. A 4 cc. sample of the resulting solution is withdrawn and mixed with 5 cc. of 2 N $H_2SO_4$ and 2 grams of potassium iodide. The resulting solution is then titrated with 0.25 N thiosulfate solution. Likewise a 4 cc. sample of the 5 volume hydrogen peroxide solution (without enzyme addition) is mixed with 5 cc. of 2 N $H_2SO_4$ and 2 grams of potassium iodide and also titrated with the same 0.25 N thiosulfate solution. In each case the appearance of an iodine color in the titrated solution serves as the end point. Subtract the difference between the two titrations from which may be calculated the equivalent of hydrogen peroxide decomposed by the enzyme in the first solution. A unit of catalase may be defined as that amount of enzyme which, under the above conditions, will decompose .0155 equivalent or 0.264 gram of hydrogen peroxide.

In the foregoing example the enzyme system employed should have both glucose oxidase and catalase activity and if desired these enzymes may be separately produced and combined in the manner indicated. However, as has been pointed out in my previous Patent No. 2,482,724, the internal enzymes from certain molds, particularly those from the genus Aspergillus and the genus Penicillium when properly cultivated, have both glucose oxidase and catalase activity and accordingly it is not necessary to separately prepare these enzymes for carrying out the processes of this invention. The ratio of glucose oxidase to catalase in these preparations is usually adequate and it is generally not necessary to add additional catalase. An important consideration is to have both enzymes present in the solution being oxidized in the presence of the added hydrogen peroxide.

As will be apparent from the foregoing discussion, it is necessary that some reagent be employed for decomposing the hydrogen peroxide to form the necessary free oxygen for the glucose oxidase catalyzed reaction. The enzyme catalase is preferred since it rapidly reacts with the generated and added hydrogen peroxide to provide the necessary oxygen. Also only minute amounts of catalase are required and the small amounts of this enzyme do not usually present any significant impurity problems in the product. However, in accordance with this invention it may be desirable to substitute for the catalase certain chemical reagents which will catalyze the decomposition of hydrogen peroxide to form free oxygen and water. These substances are well known in the art and include materials as osmic acid and compounds of iron, manganese, platinum and the like. The use of osmic acid will ordinarily be avoided because of its poisonous nature.

In the foregoing hydrogen peroxide has been referred to as the material for supplying the free oxygen for the glucose oxidation step. It is, of course, preferred to use hydrogen peroxide as such since this material is relatively cheap and readily available in convenient form. However, it will be apparent that other substances may be employed which form and are in equilibrium with hydrogen peroxide in the solution. Such other substances include such peroxygen compounds as calcium peroxide, sodium peroxide, urea peroxide, sodium phosphate peroxide, the perborates and the like. Therefore, in accordance with this invention, the hydrogen peroxide may be added to the sugar solution being treated as such or in the form of those peroxygen compounds which will liberate free hydrogen peroxide upon contact with the solution, the latter then being decomposed to free oxygen by the catalase or other decomposing agent present.

The preceding example makes specific reference to the utilization of the process of this invention for the production of gluconic acid from glucose. However, it will be readily apparent that this invention also has wide applicability in the art of treating solutions, colloids or suspensions containing sugars or other carbohydrates. For example, the invention is suitable for removing glucose from solution or other aqueous media, it being converted directly to gluconic acid which latter may or may not then be separated from the solution by any appropriate method. The process also has broad applicability in the separation of two or more sugars in solution, such as glucose, mannose, galactose and/or xylose. For example, a sugar solution comprising a mixture of mannose and glucose may be treated in the manner indicated above in the example with hydrogen peroxide and an enzyme system having glucose oxidase and catalase activity. The glucose oxidase causes the glucose rapidly to be converted to gluconic acid. The mannose is only slightly affected by the glucose oxidase and the major proportion of it will remain in the treated solution unchanged. The gluconic acid may be separated from the solution in any desired manner such as by precipitation as calcium gluconate.

Similarly the process may be employed for the separation of glucose and fructose in solution. Such a process finds applicability in the preparation of pure fructose from sucrose. In this process the enzyme sucrase or invertase is included in a sucrose solution containing glucose oxidase, catalase and hydrogen peroxide. The sucrase acts at room temperature to convert the sucrose to a mixture of equal proportions of glucose and fructose. Fructose is inert in the enzymatic solution but the glucose is then oxidized as above described by the glucose oxidase and liberated oxygen to gluconic acid which may then readily be separated from the unconverted fructose by methods understood in the art which may include the precipitation of calcium gluconate as above described.

Likewise the process is suitable for preparing gluconic acid from other polysaccharides, such as maltose, lactose, dextrin or starch, by the use of suitable additional enzymes, such as maltase, lactase, dextrinase and/or diastase, the latter enzymes serving to convert the polysaccharide to glucose in the solution which is in turn oxidized to gluconic acid. In the case of lactose, a purified galactose may be prepared as a by-product in the same manner as fructose may be a by-product in the above described process for treating sucrose.

In the foregoing description reference has been made to processes of treating pure solutions of sugars. While it is important that the aldose, such as glucose, undergoing oxidation by the enzymatic process be in solution, there may be other materials present which may or may not be in solution. Thus the invention has applicability in the treatment of emulsions, suspensions or other water-containing media wherein the glucose or other aldose is in solution form and the treatment of such media is contemplated within the scope of this invention.

An important feature of this invention is that a process has been provided for converting glucose to gluconic acid by a rapid and commercially feasible method which eliminates the usual prior art microbiological fermentation techniques for carrying out such a conversion. Substantially quantitative conversion of the glucose may be effected and the usual losses such as experienced in the fermentation industry are not encountered. In addition there is no necessity for sterilizing techniques, one reason being that the sugar concentration may be sufficiently high to prevent undesirable action by chance contaminating organisms, another reason being that the continued addition of hydrogen peroxide tends to sterilize the material undergoing treatment, thereby preventing undesired propagation of microorganisms. In addition the process of this invention may be carried out sufficiently rapidly so that the substantial growth of microorganisms would not have a chance to occur in any event. In other words, a feature of this invention is the provision of an enzymatic process which is carried out by the utilization of a substantially nonviable enzyme system.

While this invention finds particular usefulness in the oxidation of glucose by means of glucose oxidase, it will be aparent that in its broader aspects the invention is useful for treating solutions of other aldoses in the presence of an enzyme which has an oxidase activity specific for such aldose. Thus by this process other aldoses, such as mannose, galactose, xylose, erythrose, arabinose, ribose, and the like, may be oxidized to the corresponding aldose acid by a suitable oxidase specific for such aldose in the presence of hydrogen peroxide (or a hydrogen peroxide liberating compound) and catalase (or other substance capable of liberating free oxygen from hydrogen peroxide).

Also in carrying out the process of this invention, the hydrogen peroxide is preferably added to the solution undegoing conversion in increments or slowly as the conversion reaction proceeds. If the hydrogen peroxide is added all at once the catalase, which is highly active, may cause the rapid evolution of oxygen which will escape from the media being treated and will thus not be available for the slower aldose oxidation reaction. However, if a slower acting hydrogen peroxide decomposing compound is employed as the catalyst, the hydrogen peroxide may all be added initially.

The invention disclosed and claimed in this application is related to the subject matter disclosed in my Patent No. 2,482,724, issued September 20, 1949, application for Reissue Serial No. 164,593, filed May 26, 1950, and Baldwin application Serial No. 179,652, filed August 15, 1950.

While particular embodiments of this invention are suggested above, it will be understood, of course, that the invention is not to be limited thereto, since many modifications may be made, and it is contemplated, therefore, by the appended claims, to cover any such modifications as fall within the true spiirt and scope of this invention.

I claim:

1. A process for converting glucose to a gluconic acid compound which comprises adding to an aqueous solution of glucose a substantially nonviable enzyme system having catalase and glucose oxidase activity and a quantity of hydrogen peroxide in stoichiometric excess of that required to oxidize substantially all of said glucose whereby said glucose is oxidized to said acid compound.

2. A process of removing glucose from an aqueous solution containing same which comprises adding to said solution a substantially nonviable enzyme system having glucose oxidase and catalase activity and a quantity of hydrogen peroxide in stoichiometric excess of that required to oxidize substantially all of said glucose whereby said glucose is oxidized to said acid compound, and thereafter separating said acid compound from the resulting medium.

3. A process of removing glucose from an aqueous solution containing same which comprises adding to said solution a substantially nonviable enzyme system containing glucose oxidase and catalase, agitating the resulting solution and adding from time to time increments of hydrogen peroxide thereto, the total quantity of said hydrogen peroxide being in stoichiometric excess of that required to oxidize substantially all of said glucose whereby said glucose is oxidized to said acid compound, and thereafter separating said acid compound from the resulting medium.

4. A process of removing glucose from an aqueous solution containing same which comprises adding to said solution a substantially nonviable enzyme system having glucose oxidase and catalase activity, a compound of calcium, and a quantity of hydrogen peroxide in stoichiometric excess of that required to oxidize substantially all of said glucose whereby said glucose is oxidized to form calcium gluconate, and thereafter separating said calcium gluconate from the resulting medium.

5. The process recited in claim 4 wherein said compound of calcium is calcium carbonate.

6. The process of converting glucose to a gluconic acid compound in an aqueous medium containing glucose and a nonviable enzyme system having catalase activity which comprises adding to said medium glucose oxidase and a quantity of hydrogen peroxide in stoichiometric excess of that required to oxidize said glucose.

DWIGHT L. BAKER.

References Cited in the file of this patent

UNITED STATES PATENTS

| Number | Name | Date |
|---|---|---|
| 1,809,797 | Cahn | June 9, 1931 |
| 2,351,500 | Moyer | June 13, 1944 |

FOREIGN PATENTS

| Number | Country | Date |
|---|---|---|
| 626,848 | Great Britain | July 1949 |

OTHER REFERENCES

Foster: Chemical Activities of Fungi, 1949, pages 446 to 461, 466 to 467.

Tauber: Chemistry and Technology of Enzymes, 1949, Wiley, page 246.